United States Patent

Ikeya et al.

[11] Patent Number: 5,876,858
[45] Date of Patent: Mar. 2, 1999

[54] MAGNETO-OPTICAL RECORDING MEDIUM WITH MAGNETIC FILM HAVING LARGE MAGNETIC ANISOTROPY

[76] Inventors: Tomonori Ikeya; Tsutomu Tanaka; Haruhiko Izumi, all of c/o Fujitsu Limited, 1015, Kamikodanaka, Nakahara-ku, Kawasaki-shi, Kanagawa 211, Japan

[21] Appl. No.: 709,640

[22] Filed: Sep. 9, 1996

Related U.S. Application Data

[63] Continuation of Ser. No. 381,140, Jan. 31, 1995, abandoned.

[30] Foreign Application Priority Data

Mar. 15, 1994 [JP] Japan .................................. 6-044194

[51] Int. Cl.$^6$ .................................. H01F 1/00; G11B 7/24
[52] U.S. Cl. .......................... 428/611; 428/928; 428/469; 428/693; 428/694 DE; 428/694 RE; 428/694 RL; 428/694 MM; 369/286; 369/288
[58] Field of Search ...................... 428/471, 472, 428/472.2, 469, 693

[56] References Cited

U.S. PATENT DOCUMENTS

| 4,680,742 | 7/1987 | Yamada et al. | 369/13 |
| 4,711,821 | 12/1987 | Kikuchi et al. | 428/457 |
| 4,902,584 | 2/1990 | Uchiyama et al. | 428/694 |
| 5,325,345 | 6/1994 | Shimokawato et al. | 369/13 |
| 5,389,455 | 2/1995 | Saito et al. | 428/694 EC |
| 5,400,307 | 3/1995 | Ochiai et al. | 369/13 |
| 5,411,838 | 5/1995 | Strandjord et al. | 430/321 |
| 5,623,458 | 4/1997 | Matsumoto et al. | 369/13 |
| 5,663,936 | 9/1997 | Tanaka et al. | 369/13 |

FOREIGN PATENT DOCUMENTS

| 59-71144 | 4/1984 | Japan . |
| 2-195544 | 8/1990 | Japan | 428/611 |
| 3 35446 | 2/1991 | Japan . |

*Primary Examiner*—David A. Simmons
*Assistant Examiner*—Linda L. Gray

[57] ABSTRACT

A magneto-optical recording medium improved in reproduction stability and carrier-to-noise ratio by enlarging the magnetic anisotropy of a magnetic film. The magneto-optical recording medium is composed of a transparent substrate, a first dielectric film laminated on the transparent substrate, a magnetic film laminated on the first dielectric film, and a second dielectric film laminated on the magnetic film. The second dielectric film is formed from a material different from a material of the first dielectric film, and has film stress different from film stress of the first dielectric film. Accordingly, the coercive force and the magnetic anisotropy of the magnetic film can be enlarged.

6 Claims, 5 Drawing Sheets

MAGNETO-OPTICAL RECORDING MEDIUM WITH MAGNETIC FILM HAVING LARGE MAGNETIC ANISOTROPY

RELATED APPLICATION

This is a continuation of application Ser. No. 08/381,140 filed on Jan. 31, 1995, now abandoned.

BACKGROUND OF THE INVENTION

1. Field of the Invention

The present invention relates to a magneto-optical recording medium on which information is recorded or erased by utilizing a rise in temperature of the medium by a laser beam and information is reproduced by utilizing a magneto-optical effect.

2. Description of the Related Art

A magneto-optical disk is known as a rewritable high-density recording medium, and an increase in information quantity gives rise to a desire for higher densities of the medium. Further, various methods have been proposed as magneto-optical recording methods in the next generation, and the requirement to the quality of the recording medium has been further increased. The magneto-optical recording medium is required not only to allow its production at low costs with simple steps, but also to allow a high signal quality and high reproduction stability.

A rare earth-transition metal amorphous alloy film such as TbFeCo or GdFeCo is used as a magnetic recording film constituting the magneto-optical recording medium. However, such a magnetic film has a defect that its characteristics are prone to be deteriorated by oxidation or the like. To cope with this, the magneto-optical recording medium generally has a structure that a first dielectric film, a magnetic film, and a second dielectric film are laminated together in this order over a transparent substrate. In some case, a metal reflective film is further laminated on the second dielectric film. Thus, the magnetic film is sandwiched between the first dielectric film and the second dielectric film to thereby prevent moisture contained in the substrate and oxygen or the like in the atmospheric air from reaching the magnetic film, thus suppressing the deterioration of the characteristics of the magnetic film.

Further, as the first dielectric film is provided between the substrate and the magnetic film, the multiple interference effect (Kerr enhance effect) of a laser beam utilizing a difference in refractive index between the substrate and the first dielectric film can be exhibited to thereby apparently enlarge the Kerr rotation angle of the magnetic film, thus allowing a high reproduction output to be obtained in reading information. In a conventional magneto-optical recording medium, the first and second dielectric films are formed from the same kind of materials. For instance, the first and second dielectric films are formed from silicon nitride (SiN) or aluminum nitride (AlN).

It is known that when stress is applied on a magnetic body, perpendicular magnetization anisotropic energy is accordingly generated in the magnetic body. If this property is applied to magnetic recording or magneto-optical recording, the properties of the magnetic film may be controlled, and recording medium greatly superior in characteristics to the conventional recording medium may be produced even with use of the same magnetic film as that in the prior art.

In Japanese Patent Laid-open No. 4-13869, there is disclosed a film forming method for a magneto-optical recording medium wherein an Ar gas pressure is increased in forming a recording magnetic film to thereby enlarge internal stress in the magnetic film. The enlargement of the internal stress in the magnetic film is intended to improve carrier-to-noise ratio (C/N). However, the Ar gas pressure of the film forming conditions described in this publication is high such as 10 to 100 mTorr, causing instability of discharge during sputtering. As a result, a good-quality magnetic film cannot be obtained.

SUMMARY OF THE INVENTION

It is therefore an object of the present invention to provide a magneto-optical recording medium which can improve reproduction stability and C/N by enlarging the magnetic anisotropy of a magnetic film.

In accordance with an aspect of the present invention, there is provided a magneto-optical recording medium comprising a transparent substrate; a first dielectric film laminated on the transparent substrate; a magnetic film laminated on the first dielectric film; and a second dielectric film laminated on the magnetic film, the second dielectric film being formed from a material different from a material of the first dielectric film and having film stress different from film stress of the first dielectric film.

Preferably, one of the first dielectric film and the second dielectric film has tensile stress, and the other has compressive stress. The first dielectric film and the second dielectric film are formed from nitrides or oxides primarily containing at least one element selected from the group consisting of Al, Si, B, Ti, Zr, Nb, and Ta.

According to the present invention, the first and second dielectric films having different film stresses are provided on both surfaces of the magnetic film, thereby allowing a large coercive force and a large magnetic anisotropy of the recording medium without a change in fundamental properties of the magnetic film, such as a Curie temperature and a Kerr effect. Since the recording medium has a large coercive force, reproduction stability is improved. Further, since the recording medium has a large magnetic anisotropy, noise is reduced to improve C/N.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
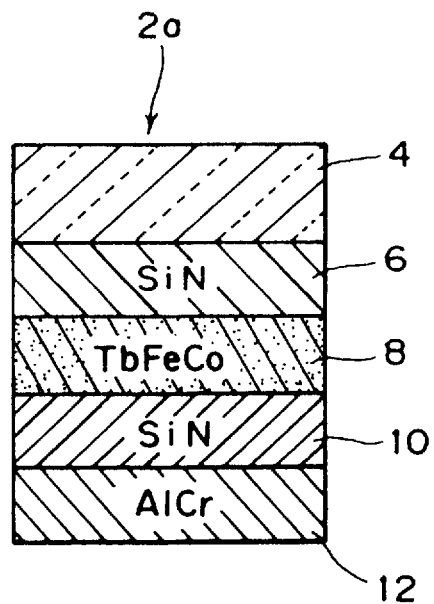
FIG. 1 is a vertical sectional view of a recording medium in the prior art.

To promote a better understanding of the present invention, there will first be described the structures of some prior art magneto-optical recording media. Referring to FIG. 1, there is shown the structure of a first prior art magneto-optical recording medium 2a. The magneto-optical recording medium 2a has a transparent substrate 4 formed from polycarbonate or the like. A transparent first dielectric film 6 formed from SiN is laminated on the transparent substrate 4. A magnetic film 8 having a thickness of 25 nm and formed from TbFeCo is laminated on the first dielectric film 6. A second dielectric film 10 formed from SiN, which is the same material as that of the first dielectric film 6, is laminated on the magnetic film 8. A reflective film 12 formed from AlCr is laminated on the second dielectric film 10. Thus, the first prior art magneto-optical recording medium 2a has the structure that the magnetic film 8 is sandwiched between the first and second dielectric films 6 and 10 which are formed from the same material.

Figure 2:
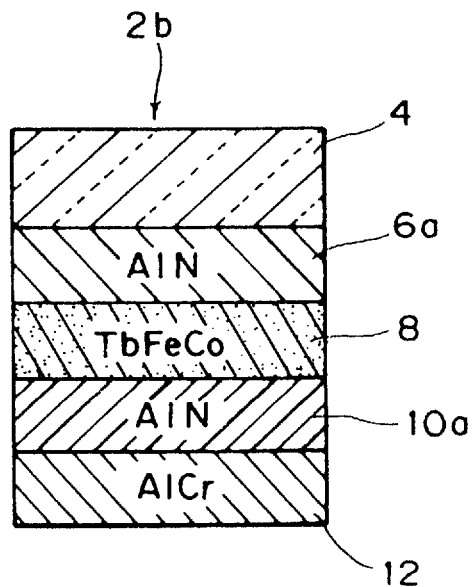
FIG. 2 is a vertical sectional view of another recording medium in the prior art.

Referring to FIG. 2, there is shown the structure of a second prior art magneto-optical recording medium 2b. The second prior art magneto-optical recording medium 2b is substantially the same in structure as the first prior art magneto-optical recording medium with the exception that AlN is adopted as the material for first and second dielectric films 6a and 10a.

Figure 3:
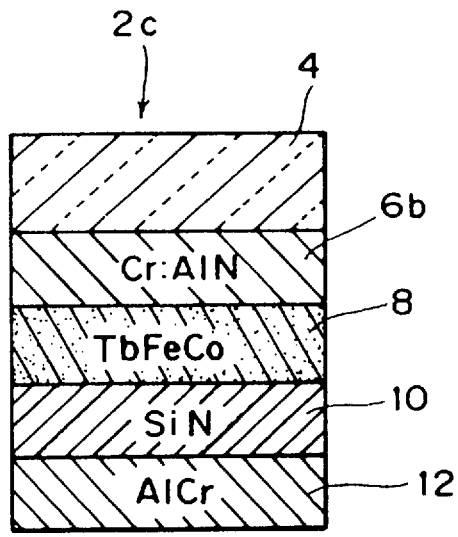
FIG. 3 is a vertical sectional view of a recording medium according to a first preferred embodiment of the present invention.

Referring to FIG. 3, there is shown the structure of a magneto-optical recording medium 2c according to a first preferred embodiment of the present invention. The magneto-optical recording medium 2c has a transparent substrate 4 formed from polycarbonate or the like. A transparent first dielectric film 6b having a thickness of 70 nm and formed from Cr:AlN is laminated on the transparent substrate 4. A magnetic film 8 having a thickness of 25 nm and formed from TbFeCo is laminated on the first dielectric film 6b. The composition of the magnetic film 8 is $Tb_{20}Fe_{72}Co_8$, which is similar to that of the first and second prior art magneto-optical recording media.

A transparent second dielectric film 10 having a thickness of 15 nm and formed from SiN is laminated on the magnetic film 8. A reflective film 12 having a thickness of 60 nm and formed from AlCr is laminated on the second dielectric film 10. Thus, the magneto-optical recording medium 2c according to the first preferred embodiment is characterized by the use of different materials for the first and second dielectric films 6b and 10, and the other parts are the same as those of the first and second prior art magneto-optical recording media. Each film is formed over the substrate 4 by DC sputtering, for example.

The formation of each film was performed by DC sputtering with an applied power of 0.8 kW in a vacuum chamber under an ultimate vacuum of $5 \times 10^{-5}$ Pa or less. Specifically, the formation of the first dielectric film 6b was performed by sputtering with AlCr as a target in an atmosphere of Ar mixed with 30 to 40% of $N_2$ under a gas pressure of 0.2 to 0.5 Pa. The formation of the magnetic film 8 was performed by sputtering with $Tb_{20}Fe_{72}Co_8$ as a target in an atmosphere of Ar under a gas pressure of 0.5 Pa.

The formation of the second dielectric film 10 was performed by sputtering with Si as a target in an atmosphere of Ar mixed with 35 to 40% of $N_2$ under a gas pressure of 0.2 Pa. The formation of the reflective film 12 was performed by sputtering with AlCr as a target in an atmosphere of Ar under a gas pressure of 0.5 Pa. Thus, each film is formed by reactive sputtering to generate stress. The first dielectric film 6b has tensile stress, and the second dielectric film 10 has compressive stress. Accordingly, the magnetic film 8 sandwiched between the first dielectric film 6b and the second dielectric film 10 undergoes a very strong stress, thus obtaining a large magnetic anisotropy.

The tensile stress in the first dielectric film 6b can be enlarged by doping AlN with a small amount of Cr. The amount of Cr as a dopant in AlN is suitably 1 to 5% from the viewpoint of prevention of optical absorption of the first dielectric film 6b. In this preferred embodiment, AlN was doped with 1.5% of Cr.

In the first prior art magneto-optical recording medium, both the first and second dielectric films 6 and 10 formed from SiN have compressive stress. On the other hand, in the second prior art magneto-optical recording medium, both the first and second dielectric films 6a and 10a formed from AlN have tensile stress. Thus in each of the prior art magneto-optical recording media shown in FIGS. 1 and 2, the magnetic film 8 is sandwiched between the dielectric films of the same kind, so that the magnetic film 8 undergoes a not so large stress. As a result, the magnetic anisotropy of the magnetic film 8 is small.

Figure 4:
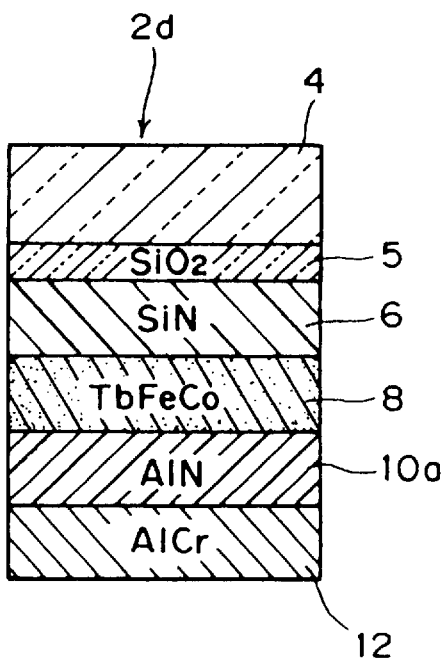
FIG. 4 is a vertical sectional view of a recording medium according to a second preferred embodiment of the present invention.

Referring to FIG. 4, there is shown the structure of a magneto-optical recording medium 2d according to a second preferred embodiment of the present invention. The magneto-optical recording medium 2d according to the second preferred embodiment is characterized in that an $SiO_2$ film 5 having a thickness of about 5 nm is laminated on a transparent substrate 4 and that a first dielectric film 6 having a thickness of 70 nm and formed from SiN is laminated on the $SiO_2$ film 5. Since the SiN film 6 has compressive stress, the adhesion thereof to the substrate 4 is not so good. To cope with this, the $SiO_2$ film 5 acting as a binder between the substrate 4 and the SiN film 6 is laminated on the substrate 4.

A second dielectric film 10a formed from AlN is laminated on a magnetic film 8, and has tensile stress. Thus, the magnetic film 8 in this preferred embodiment is also sandwiched between the first and second dielectric films 6 and 10a having stresses different from each other in magnitude and direction. Therefore, the magnetic film 8 undergoes a very strong stress to obtain a large magnetic anisotropy.

Figure 5:
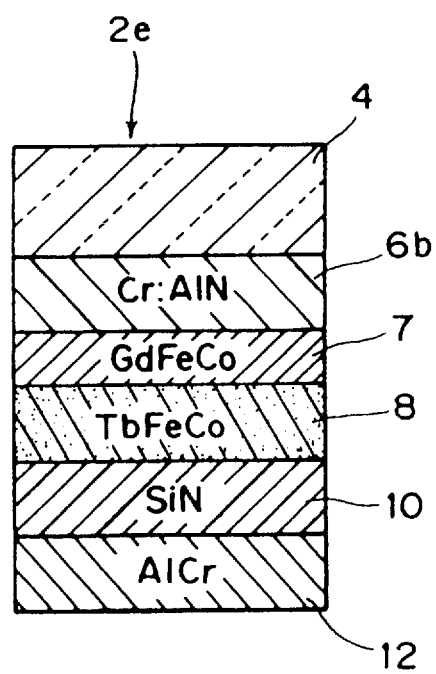
FIG. 5 is a vertical sectional view of a recording medium according to a third preferred embodiment of the present invention.

Referring to FIG. 5, there is shown the structure of a magneto-optical recording medium 2e according to a third preferred embodiment of the present invention. The magneto-optical recording medium 2e according to the third preferred embodiment has two magnetic films 7 and 8 laminated together. The first magnetic film 7 is formed from GdFeCo, and the second magnetic film 8 is formed from TbFeCo. For example, the first magnetic film 7 has a composition of $Gd_{23}(Fe_{75}Co_{25})_{77}$, and the second magnetic film 8 has a composition similar to that in the first preferred embodiment.

The first magnetic film 7 and the second magnetic film 8 are sandwiched between a first dielectric film 6b formed from Cr:AlN and a second dielectric film 10 formed from SiN. The first magnetic film 7 has a thickness of 5 nm to 10 nm, and the second magnetic film 8 has a thickness of 15 nm to 20 nm. Thus, the total thickness of the first and second magnetic films 7 and 8 ranges from 25 nm to 30 nm. Also in this preferred embodiment, the first and second magnetic films 7 and 8 are sandwiched between the first dielectric film 6b and the second dielectric film 10 having stresses different from each other in magnitude and direction. Therefore, the magnetic films 7 and 8 undergo large stress to obtain a large magnetic anisotropy. Since the first magnetic film 7 is formed from GdFeCo, a large Kerr rotation angle can be obtained even with use of a laser having a short wavelength, thereby improving C/N.

Figure 6:
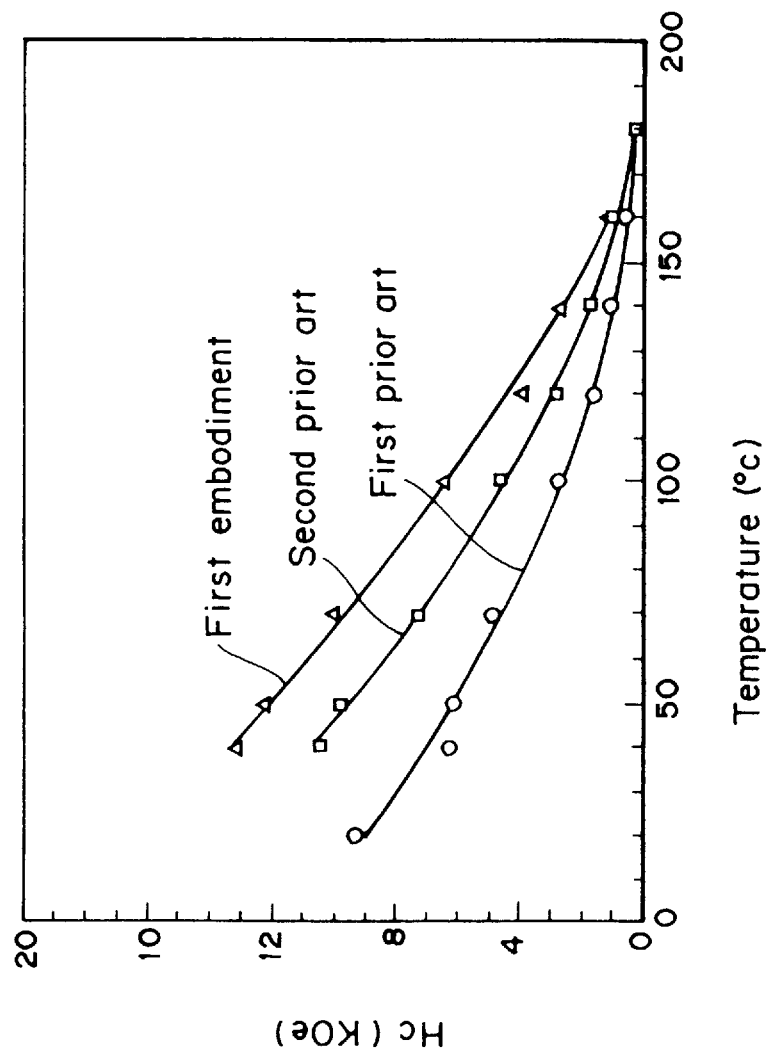
FIG. 6 is a graph showing the temperature characteristic of a coercive force.

Referring to FIG. 6, there are shown the temperature characteristics of coercive forces Hc in the first prior art magneto-optical recording medium, the second prior art magneto-optical recording medium, and the magneto-optical recording medium according to the first preferred embodiment of the present invention. As apparent from FIG. 6, the magneto-optical recording medium according to the first preferred embodiment has a coercive force larger than the coercive force in both prior art magneto-optical recording media. Thus, such a large coercive force of the magneto-optical recording medium of the present invention is considered to improve reproduction stability.

Figure 7:
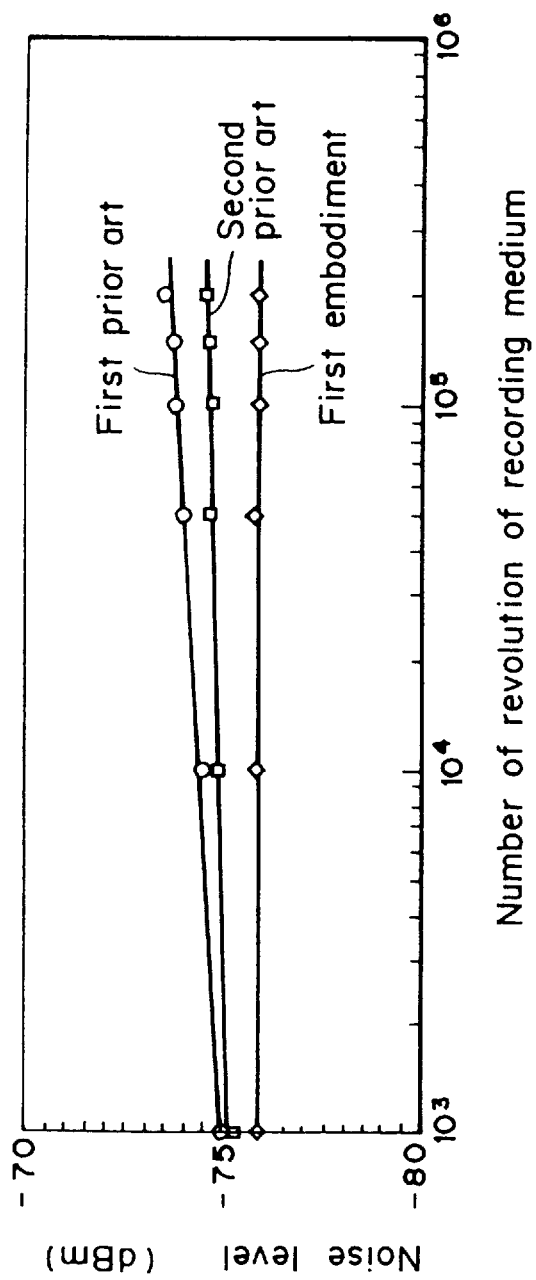
FIG. 7 is a graph showing the reproduction stability of the present invention in comparison with the prior art.

The reproduction stability of the magneto-optical recording medium according to the first preferred embodiment will now be described in comparison with that of the prior art magneto-optical recording media with reference to FIG. 7. Marks each having a length of 0.66 μm are previously recorded, and these marks are continuously read with a reproducing power of 2.9 mW. In each of the first and second prior art magneto-optical recording media, a noise level increases with an increase in number of revolutions of the recording medium. To the contrary, the magneto-optical recording medium according to the first preferred embodiment has a low noise level and is greatly superior in the reproduction stability, because the first dielectric film and the second dielectric film are different kinds of films having different film stresses, thereby obtaining a large coercive force even at high temperatures.

A carrier-to-noise ratio C/N and a magnetic anisotropy constant Ku at room temperature were measured on the prior art recording media and the recording medium according to the first preferred embodiment. The results are shown in Table 1. Recording conditions including a peripheral speed, a recording frequency, and a mark length are also shown in Table 1.

TABLE 1

|  | C/N (dB)/N (dBm) |  |  | Ku (erg/c.c.) |
|---|---|---|---|---|
| First prior art | 52.1/−75.7 | 48.5/−76.4 | 46.4/−74.8 | 1.1 × 10⁶ |
| Second prior art | 53.0/−76.7 | 48.6/−76.6 | 46.6/−75.0 | 1.3 × 10⁶ |
| First Preferred embodiment | 53.6/−77.3 | 49.8/−77.2 | 47.5/−75.9 | 2.7 × 10⁶ |
| Peripheral speed (m/s) | 9 | 9 | 9 |  |
| Recording frequency (MHz) | 4.5 | 5.8 | 6.8 |  |
| Mark length (μm) | 1.0 | 0.78 | 0.66 |  |

As apparent from Table 1, noise N is reduced in the recording medium according to the first preferred embodiment, and C/N is increased by about 1 dB at each recording frequency in the recording medium according to the first preferred embodiment as compared with the prior art recording media. This is due to the fact that the magnetic anisotropy is increased twice or more as apparent from the value of Ku.

Table 2 shows C/N and noise N in forming the first dielectric film and the second dielectric film from various materials. The top row in Table 2 shows an example in the prior art wherein the first dielectric film and the second dielectric film are formed from the same kind of materials. In all examples shown in Table 2, the magnetic films are similar to the magnetic film employed in the first preferred embodiment.

TABLE 2

| First dielectric film/ second dielectric film | C/N (dB)/N (dBm) | | |
|---|---|---|---|
| Y—SiO₂/Y—SiO₂ (85 nm/25 nm) | 51.2/−75.8 | 47.5/−76.5 | 44.9/−74.5 |
| Y—SiO₂/SiN (85 nm/15 nm) | 52.0/−76.6 | 47.8/−76.9 | 45.4/−75.1 |
| Y—SiO₂/AlN (85 nm/15 nm) | 52.3/−76.9 | 48.2/−77.1 | 45.9/−75.3 |
| SiN/Y—SiO₂ (70 nm/25 nm) | 52.9/−76.8 | 49.0/−77.0 | 47.0/−75.2 |
| AlN/Y—SiO₂ (70 nm/25 nm) | 53.5/−77.2 | 49.6/−77.5 | 47.2/−75.5 |
| SiN/AlN (70 nm/15 nm) | 53.2/−77.0 | 49.5/−77.5 | 47.1/−75.3 |
| Peripheral speed (m/s) | 9 | 9 | 9 |
| Recording frequency (MHz) | 4.5 | 5.8 | 6.8 |
| Mark length (μm) | 1.0 | 0.78 | 0.66 |

As apparent from Table 2, when the first dielectric film and the second dielectric film are formed from different materials, the noise N is reduced and the C/N is therefore improved at each recording frequency.

According to the present invention, the coercive force and the magnetic anisotropy of the magnetic film can be enlarged without a change in fundamental properties of the magnetic film, such as a Curie temperature and a Kerr effect. The enlargement of the coercive force improves reproduction stability, and the enlargement of the magnetic anisotropy reduces noise to thereby improve C/N.

What is claimed is:

1. A magneto-optical recording medium comprising:

a transparent substrate;

a first dielectric film laminated on said transparent substrate;

a magnetic film laminated on said first dielectric film, said magnetic film being formed of a rare earth-transition metal amorphous alloy; and a second dielectric film laminated on said magnetic film, wherein one of said first dielectric film and said second dielectric film is formed from aluminum nitride and has tensile stress and the other is formed from silicon nitride and has compressive stress, said tensile stress and said compressive stress acting to increase the magnetic anisotropy of said magnetic film.

2. The magneto-optical recording medium according to claim 1, further comprising a reflective film containing at least one element selected from the group consisting of Al, Cu, and Cr.

3. The magneto-optical recording medium according to claim 1 wherein said dielectric film of aluminum nitride contains 1–5% of Cr.

4. A magneto-optical recording medium comprising:

a transparent substrate;

a first dielectric film laminated on said transparent substrate;

a first magnetic film laminated on said first dielectric film, said first magnetic film being formed of a rare earth-transition metal amorphous alloy;

a second magnetic film laminated on said first magnetic film, said second magnetic film being formed of a rare earth-transition metal amorphous alloy; and a second dielectric film laminated on said second dielectric film, said first dielectric film and said second dielectric film being formed from and of nitrides and oxides containing at least one element selected from the group consisting of Al Si, B, Ti, Zr, Nb, and Ta, one of said first dielectric film and said second dielectric film having tensile stress and the other having compressive stress, said tensile stress and said compressive stress acting to increase the magnetic anisotropy of said first and second magnetic films.

5. The magneto-optical recording medium according to claim 4, further comprising a reflective film containing at least one element selected from the group consisting of Al, Cu, and Cr.

6. A magnetic-optical recording medium comprising:

a transparent substrate;

a first dielectric film laminated on said transparent substrate, said first dielectric film being formed from one of nitrides and oxides of at least one element selected from the group consisting of Al, B, Ti, Nb, Zr, and Ta;

a magnetic film laminated on said first dielectric film, said magnetic film being formed of a rare earth transition metal amorphous alloy; and a second dielectric film laminated on said magnetic film, said second dielectric film being formed of a material different from the material of said first dielectric film, one of said first dielectric film and said second dielectric film having tensile stress and the other having compressive stress, said second dielectric film being formed from one of nitrides and oxides of at least one element selected from the group consisting of Al, Si, B, Ti, Nb, Zr, and Ta, said tensile stress and said compressive stress acting to increase the magnetic anisotropy of said magnetic film.

* * * * *

UNITED STATES PATENT AND TRADEMARK OFFICE
CERTIFICATE OF CORRECTION

PATENT NO. : 5,876,858
DATED : March 2, 1999
INVENTOR(S) : Ikeya et al.

It is certified that error appears in the above-identified patent and that said Letters Patent is hereby corrected as shown below:

On the Title Page:

Under "[73] Assignee" please insert

--Assignee: Fujitsu Limited, Kawasaki, Japan--

Column 6, line 53, delete "of"

Column 6, line 66, delete "and of" and insert

--one of-- therefor

Signed and Sealed this

Twenty-seventh Day of March, 2001

Attest:

NICHOLAS P. GODICI

*Attesting Officer*   *Acting Director of the United States Patent and Trademark Office*